July 3, 1923.

J. W. HICKS ET AL

FILM DRIER

Filed Nov. 9, 1921

WITNESSES

INVENTOR
W. W. Hicks,
J. W. Hicks,
BY

ATTORNEYS

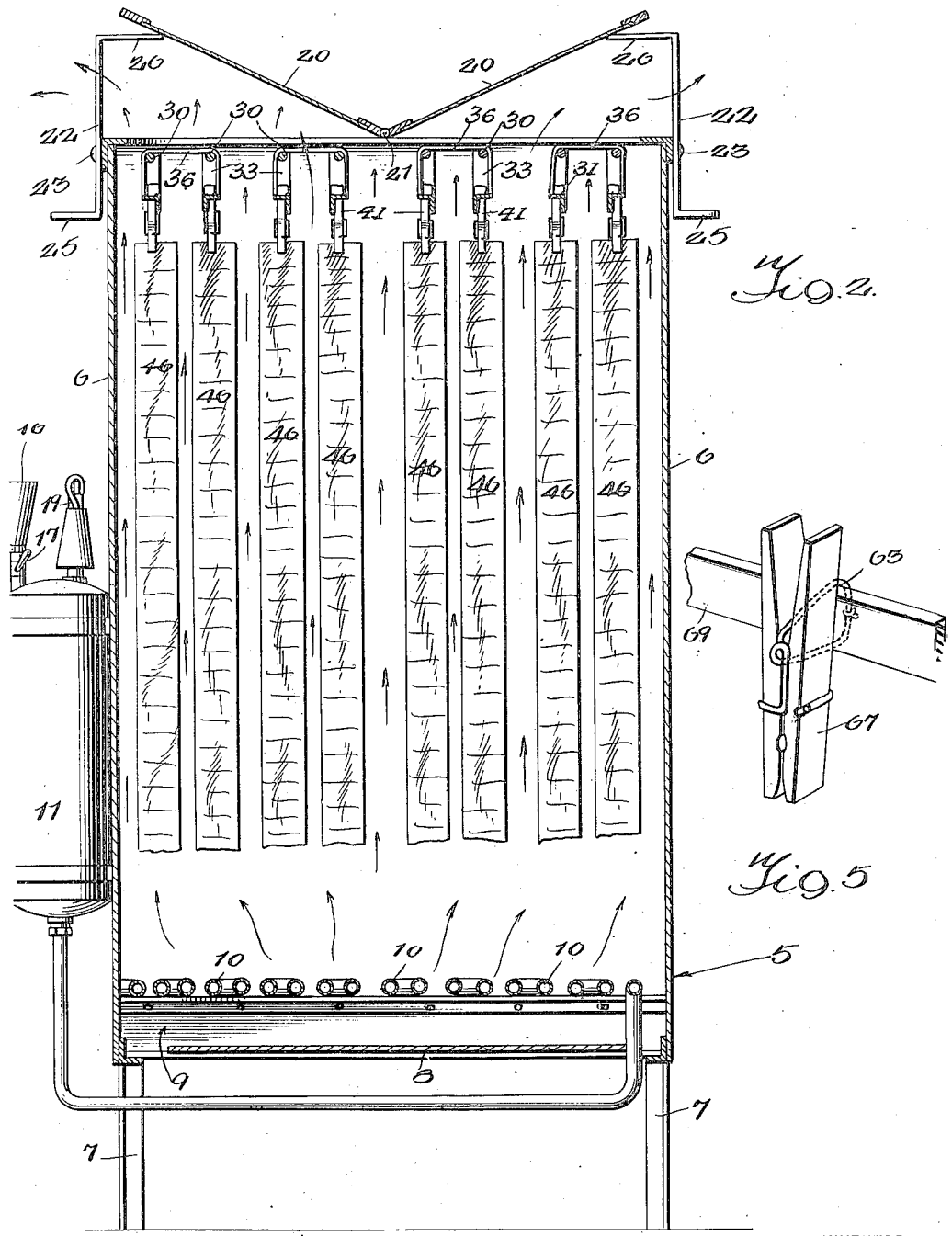

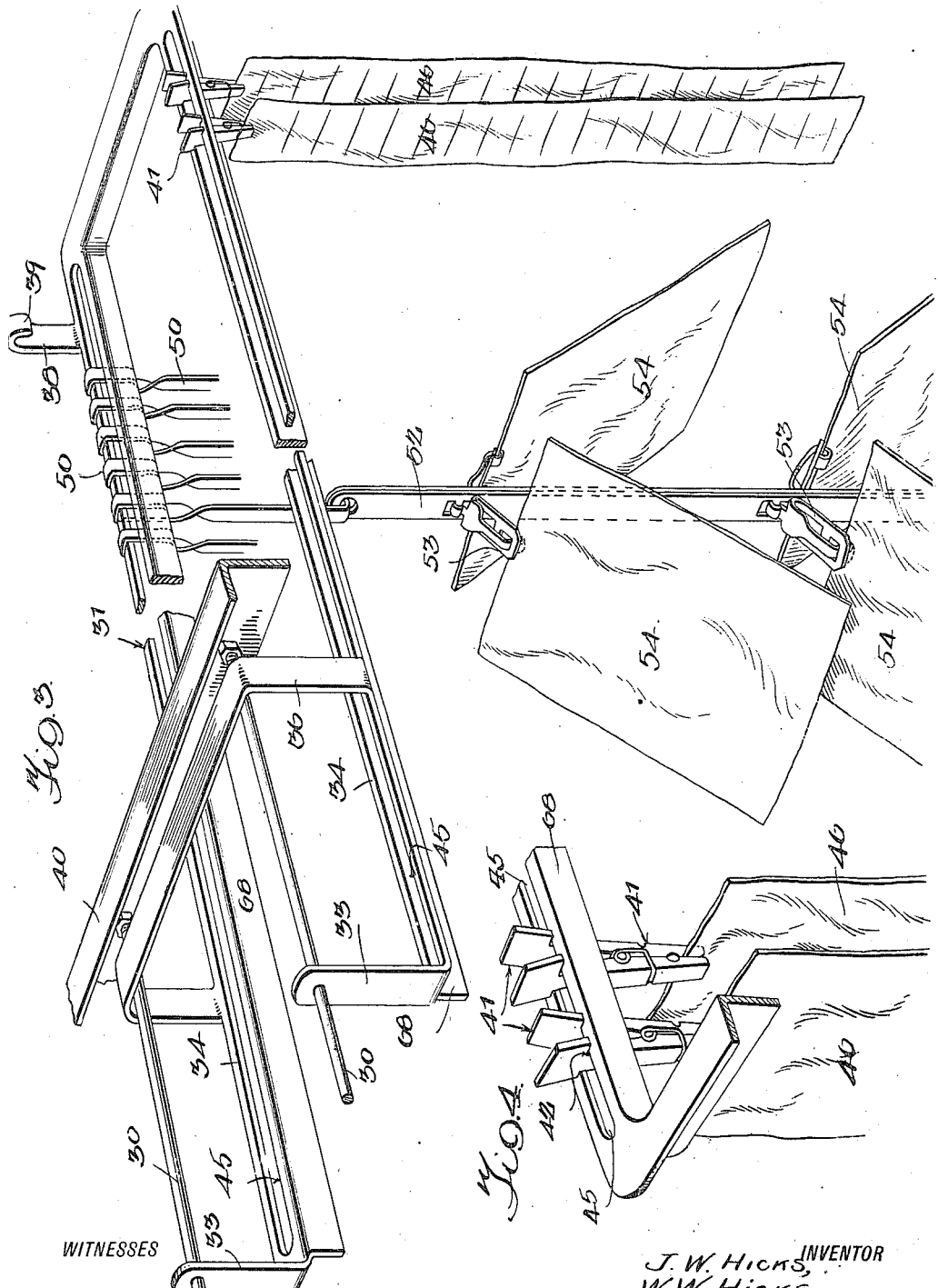

Patented July 3, 1923.

1,460,378

UNITED STATES PATENT OFFICE.

JOHN W. HICKS, OF MADISON, WISCONSIN, AND WALTER W. HICKS, OF WASHINGTON, DISTRICT OF COLUMBIA.

FILM DRIER.

Application filed November 9, 1921. Serial No. 514,002.

*To all whom it may concern:*

Be it known that we, JOHN W. HICKS and WALTER W. HICKS, citizens of the United States, and residents, respectively, of Madison, county of Dane, and State of Wisconsin, and Washington, in the District of Columbia, have invented certain new and useful Improvements in Film Driers, of which the following is a specification.

This invention relates to driers especially adapted for drying photographic films and the like.

An important object of this invention is to provide a drier for photographic films having a plurality of slidably supported racks provided with means whereby they may be readily positioned exteriorly of the drier so as to permit of the rapid hanging or removal of the several strips of films carried thereby.

A further object of the invention is to provide a drier for photographic films having novel means whereby a constant circulation of heated air is maintained about the films, so that the films will be properly dried but prevented from igniting.

A further object is to provide a drier for photographic films wherein the rack slidably supports a plurality of attaching or holding devices, which may be readily and conveniently operated for grasping or releasing the several films.

Further the invention forming the subject matter of this application aims to provide a film drier which is of highly simplified construction, durable in use and cheap to manufacture.

Further the invention forming the subject matter of this application aims to provide a drier which may be readily and conveniently taken apart and compactly packed for shipment and which may be conveniently set up for use.

Other objects and advantages of the invention will be apparent during the course of the following description.

In the accompanying drawings forming a part of this application and in which like numerals are employed to designate like parts throughout the same, Figure 1 is a perspective of the improved film drying apparatus.

Figure 2 is a vertical transverse sectional view through the same.

Figure 3 is a fragmentary perspective of a rack embodied in the invention, the view illustrating several of the films in position to be dried.

Figure 4 is an enlarged fragmentary perspective of the rack.

Figure 5 is a fragmentary perspective illustrating a slightly modified form of the invention.

Figure 1:
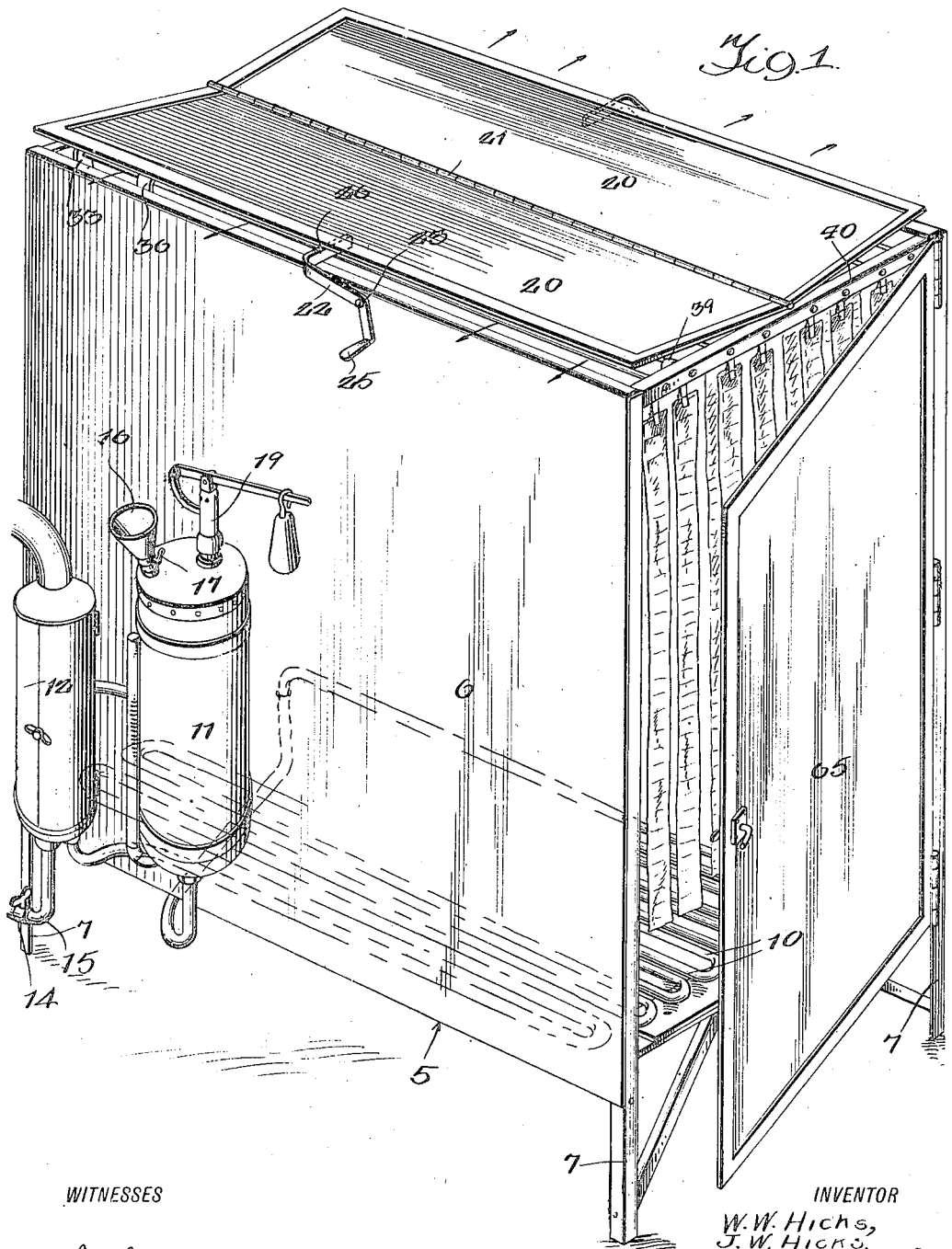

In the drawing wherein for the purpose of illustration is shown several preferred embodiments of the invention the numeral 5 generally designates a casing having spaced sides 6 supported a convenient distance above the floor by means of legs 7, said legs being extended up to the top of the casing to provide corners and if desired the legs may be of angle iron. As illustrated in Figure 2 a bottom wall 8 is arranged between the side walls 6 and is provided with spaced openings 9 through which fresh air may pass.

A heating coil 10 is arranged within the casing and has communication with a boiler 11 heated by means of a gas heater 12 or the like.

The flow of gas to the heater 12 may be controlled by means of a valve 14 interposed in the gas line 15. The boiler may be periodically filled with water by means of a filler cup or funnel 16 secured to the upper end of the boiler and having a cock 17 adapted to be opened when water is being supplied to the boiler. An automatic valve or a pressure regulated valve 19 of any desired construction may be connected to the upper end of the boiler after the manner illustrated in Figure 1.

The top of the casing or drier is provided with a pair of cover plates 20 having their adjacent longitudinal edges hinged as indicated at 21 to the top. The outer portions of the cover plates 20 may be elevated so as to provide outlet openings along opposite sides of the casing and the cover plates may be held in an elevated position by means of adjusting levers 22 pivoted intermediate their ends as indicated at 23 to opposite sides of the casing. The rear ends of the levers are provided with handle 25 adapted to be engaged by the operator when it is desired to swing the levers 22 on the pivots 23.

The forward portions of the levers 22 are extended angularly to form arms 26 arranged between the cover plates 20 and the top of the casing and forming a means whereby the outer edge portions of the cover plates are at all times maintained in spaced relation to the top of the casing, whereby a constant circulation of air is provided for. This renders it impossible for the operator to accidentally allow the cover plates to remain closed and cause the drier to overheat. With reference to Figure 1 it will be noted that the inwardly extending arms 26 are arranged on edge between the top of the casing and the adjacent portions of the cover plates so that the cover plates cannot be completely closed.

The drier is provided with pairs of spaced parallel rods 30 which form a supporting means for racks generally designated by the numeral 31 and clearly illustrated in Figures 3 and 4.

Each rack 31 is of U-shaped formation and is provided with upwardly extending apertured ears 33 at its rear end, the said apertured ears being slidably connected to the longitudinally extending rods 30. The rack 31 is provided with side arms 34 connected intermediate their ends by means of a U-shaped bow 36 extending over and slidable on the rods 30 whereby the intermediate portions of the arms 34 are prevented from sagging or drooping as a result of the weight of the films. Also the U-shaped arch 36 of each rack forms a stop element for limiting the sliding movement of the racks to their extended positions. It might be stated that when the films are being dried the racks are all positioned within the casing as illustrated in Figure 1 and when the films are being applied the racks are extended in the manner illustrated in Fig. 3. This permits the operator to have ready access to all the films supported by the several racks.

The forward portions of each U-shaped rack 31 is provided with an upwardly extending hook 38 having a bill 39 adapted to be engaged with the adjacent rods 30 so as to hold the forward portion of the rack in position and to prevent the same from sagging when several films are in position. However, when it is desired to move the several racks 31 to their extended positions for the purpose of applying or removing the films each hook 38 may be disconnected from the adjacent rods 30 and the weight of the racks will cause the bills 39 to move downwardly beneath the end pieces 40. This permits the racks to be conveniently drawn to their extended positions.

The side arms 34 of the racks are provided with longitudinal slots 45 through which clasps 41 are extended, the said clasps 41 being of the type illustrated in Fig. 4 and having their rear portions enlarged to provide shoulders 42 which rest firmly upon the upper sides of the arms. The enlarged rear portions of the clasps 41 also provide convenient gripping members which may be drawn together against the tension of the usual coiled springs employed for this purpose. The jaws of the clasps 41 may be engaged with films 46.

With reference to Figure 3 it will be observed that a plurality of hooks 50 are slidable on the several racks 31 and are adapted for supporting pack hangers 52 of the usual type, the said pack hangers being provided with spring actuated clasps 53 adapted to be engaged with pack films 54. When not in use the hooks 50 may be moved to one end of the rack so as to occupy but a small amount of space.

In operation, the several racks may be moved outwardly to their extended positions as illustrated in Figure 3 so as to permit a plurality of films 46 to be connected to the rack by means of spring clasps 41.

When the desired number of films have been suspended from the several racks, the racks may be moved into the case and the door 65 closed. The heat from the coils 10 gradually dries the films and the exit of the heat may be controlled by a proper adjustment of the levers 22. When it is desired to permit a large quantity of heat to escape the levers are swung to the position illustrated in Fig. 2 wherein it is shown that the angularly extended end portions may have their flat sides engaged with the under sides of the cover plate for holding the cover plate in elevated positions. The openings formed beneath the cover plates 20 and the openings 9 provide a means whereby a constant circulation of air through the drier is maintained. Due to the highly inflammable nature of the films it is necessary to provide for the constant movement of the air so that the films will not ignite. Since the clasps 41 are slidable through the slots the racks 31 the films may be arranged close together or wide apart and additional clasps may be added any time.

In the form of the invention illustrated in Figure 5 the spring clasp 67 is provided with a wire loop 63 slidable on the bar 69. In the case of the rack 31 the same may if desired be of angle iron and are provided with downwardly extending flanges 68 which provide a means for strengthening and reinforcing the rack. Also the flanges 68 provide a means whereby the racks may be manually engaged, without the possibility of the edges of the racks cutting into the hand of the operator. Furthermore, the bight portions of the racks are disposed at the open end of the casing and form a convenient grip for sliding the racks on the rods 30.

Having thus described the invention, what is claimed is:—

1. A drier for films comprising a casing, rods arranged therein, and racks slidable on said rods and having means for gripping articles, said article gripping means being slidably supported by said rods.

2. A drier for films comprising a casing, rods arranged therein, racks slidable on said rods and having means for gripping articles, said article gripping means being slidably supported by said rods, means whereby a constant circulation of heated air is maintained in said casing.

3. A drier comprising a casing, rods arranged therein, and a plurality of U-shaped racks having arms provided with ears slidably connected to said rods, portions of said arms being provided with a connecting arch slidable over said rods and adapted to engage one end of the casing to limit the sliding movement of the racks.

4. A drier comprising a casing, rods arranged therein, and a plurality of U-shaped racks having arms provided with ears slidably connected to said rods, portions of said arms being provided with a connecting arch slidable over said rods and adapted to engage one end of the casing to limit the sliding movement of the racks, the bight portions of said racks constituting handles whereby the racks may be moved.

5. A drier comprising a casing, rods arranged therein, and a plurality of U-shaped racks having arms provided with ears slidably connected to said rods, portions of said arms being provided with connecting arches slidable over said rods and adapted to engage one end of the casing to limit the sliding movement of the racks, the bight portions of said racks constituting handles whereby the racks may be moved, and hooks carried by the racks adjacent the forward end of the same and adapted to engage one of said rods for detachably supporting the forward end of each rack.

6. A drier comprising a casing, rods arranged therein, a plurality of U-shaped racks having arms provided with ears slidably connected to said rods, portions of said arms being provided with connecting arches slidable over said rods and adapted to engage one end of the casing to limit the sliding movement of the racks, the bight portions of said racks constituting handles whereby the racks may be moved, hooks carried by the racks adjacent the forward end of the same and adapted to engage one of said rods for detachably supporting the forward end of each rack, and slidably supported article engaging devices carried by said racks.

7. A drier comprising a casing, a plurality of U-shaped racks arranged within the casing and having spaced sides provided at their terminal portions with upwardly directed ears, rods slidably supporting said ears, the side arms of said U-shaped racks being connected by the bight portions constituting handles by means of which the racks may be operated, and a hook carried by each rack adjacent the bight portion of the same and adapted to engage the adjacent rods.

8. A drier comprising a casing, a plurality of U-shaped racks arranged within the casing and having spaced sides provided at their terminal portions with upwardly directed ears, rods slidably supporting said ears, the side arms of said U-shaped racks being connected by the bight portions constituting handles by means of which the racks may be operated, and a hook carried by each rack adjacent the bight portion of the same and adapted to engage the adjacent rods, the intermediate portions of said racks being provided with arches slidable on said rods and engaging one end of said casing to limit the endwise movement of each rack.

9. An apparatus of the class described comprising a casing having a hinged cover plate, a lever pivoted intermediate its ends to said casing and having an angularly directed end portion engaging said cover plate whereby to hold the same in a set position.

10. A drier comprising a casing having a plurality of hinged cover plates, levers pivoted intermediate their ends to said casing and having angularly extended terminal portions arranged between said cover plates and the top of the casing constituting a means for preventing the cover plates from being entirely closed, said angularly directed terminal portions of said levers being adapted to be arranged on edge between the cover plates and the top of the casing, one side of each angularly extended end portion being adapted to abut the underside of the adjacent cover plate to hold the cover plate in an elevated position.

11. A drier comprising a casing, rods carried thereby, racks slidably carried by said rods and having longitudinal slots, article engaging members extended through said slots and slidable on the racks, said article engaging devices being provided with enlarged rear ends.

JOHN W. HICKS.
WALTER W. HICKS.